United States Patent [19]

Watanabe et al.

[11] Patent Number: 5,477,514
[45] Date of Patent: Dec. 19, 1995

[54] CONTROL APPARATUS FOR CONTROLLING FOCUSING, ACCESSING AND SPINDLE ROTATING CIRCUITS TO OPERATE SIMULTANEOUSLY

[75] Inventors: Katsuya Watanabe, Suita; Motoshi Ito, Moriguchi, both of Japan

[73] Assignee: Matsushita Electric Industrial Co., Ltd., Kadoma, Japan

[21] Appl. No.: 301,178

[22] Filed: Sep. 6, 1994

[30] Foreign Application Priority Data

Sep. 7, 1993 [JP] Japan .................................. 5-221795

[51] Int. Cl.⁶ ................................................ G11B 7/085
[52] U.S. Cl. ...................... 369/44.28; 369/32; 369/44.35
[58] Field of Search .......................... 369/44.28, 44.29, 369/44.27, 44.35, 44.36, 32, 50, 51, 44.34, 44.11, 43; 250/201.5; 360/78.05

[56] References Cited

U.S. PATENT DOCUMENTS

| | | | |
|---|---|---|---|
| 4,901,298 | 2/1990 | Masaki | 369/44.28 |
| 5,054,013 | 10/1991 | Kawamura | 369/44.28 |
| 5,086,420 | 2/1992 | Doi | 369/44.25 |
| 5,105,399 | 4/1992 | Shimonou | 369/13 |
| 5,105,407 | 4/1992 | Ishika | 369/44.37 |
| 5,107,101 | 4/1992 | Ando | 369/44.31 |
| 5,289,451 | 2/1994 | Ashimuma et al. | 369/44.29 |
| 5,406,536 | 4/1995 | Doi | 369/44.29 |

FOREIGN PATENT DOCUMENTS

| | | |
|---|---|---|
| 57-150147 | 9/1982 | Japan . |
| 5885940 | 5/1983 | Japan . |
| 6489027 | 4/1989 | Japan . |
| 3254424 | 11/1991 | Japan . |
| 444808 | 7/1992 | Japan . |
| 4310638 | 11/1992 | Japan . |

*Primary Examiner*—Aristotelis Psitos
*Assistant Examiner*—Thang V. Tran

[57] ABSTRACT

In an apparatus in which information is recorded on and reproduced from a rotating recording medium by irradiating the recording medium with a converged light beam, a focus control is performed so that the light beam on the recording medium is in a prescribed converged state. In order to perform a focusing pull of the focus control, until the rotation of the disk attains a predetermined rotation frequency, the focus lens is previously moved to the inner side of the disk, and moved away from the disk. After the predetermined rotation frequency is attained, the focusing pull operation of the focus control is started from the position. Thus, it is possible to secure a stable pulling capability and to shorten the activation time of the apparatus.

8 Claims, 9 Drawing Sheets

FIG. 3  In the case where focus on level can be detected

FIG. 4  In the case where focus on level cannot be detected

CONTROL APPARATUS FOR CONTROLLING FOCUSING, ACCESSING AND SPINDLE ROTATING CIRCUITS TO OPERATE SIMULTANEOUSLY

BACKGROUND OF THE INVENTION

1. Field of the Invention

The present invention relates to an optical recording/reproducing apparatus for optically recording a signal on a recording medium and for optically reproducing the recorded signal, by using a light beam from a light source such as a laser. More particularly, the present invention relates to a focus control method and a focus control apparatus both for a focusing pull for controlling the converged state of a light beam with which the recording medium is irradiated and maintaining a prescribed converged state.

2. Description of the Related Art

An exemplary conventional focus control apparatus is an optical recording/reproducing apparatus in which a signal is recorded on or reproduced from a disk-like recording medium by converging and radiating a light beam generated from a light source such as a semiconductor laser on the recording medium which rotates at a predetermined rotation frequency. On the recording medium, minute tracks each having a width of 0.6 μm are provided at a pitch of 1.5 μm in a spiral or concentric manner. In order to record a signal on the track or reproduce the signal recorded on the track, the optical recording/reproducing apparatus performs a focus control so that the light beam with which the recording medium is irradiated is in a prescribed converged state.

FIG. 5 is a block diagram showing a schematic construction of such a conventional recording/reproducing apparatus including a focus control apparatus. Hereinafter, the conventional focus control apparatus will be described with reference to FIG. 5.

As shown in FIG. 5, the conventional recording/reproducing apparatus includes an optical system for irradiating a disk 7 as a recording medium with a light beam 8, and a disk motor 6 for rotating the disk 7 at a predetermined rotation frequency. The optical system includes a light source 1 such as a semiconductor laser, a coupling lens 2, a polarization beam splitter 3, a polarizing plate 4, and an objective lens 5. The light beam 8 generated from the light source 1 is collimated by the coupling lens 2. The collimated light is then reflected from the polarization beam splitter 3 and passes through the polarizing plate 4. Then, the light is converged by the objective lens 5, and incident on the disk 7 which is rotated by the disk motor 6.

The recording/reproducing apparatus further includes a converging lens 9 and a slit mirror 10 as elements for receiving the light reflected from the disk 7. The light reflected from the disk 7 passes through the objective lens 5, the polarizing plate 4, and the polarization beam splitter 3, and split into light beams 11 and 15 in two directions by the split mirror 10 via the converging lens 9. The light beams 11 and 15 are input into a focus control apparatus and a tracking control apparatus, respectively.

The focus control apparatus includes a 2-section photodetector 12, preamplifiers 13A and 13B, a differential amplifier 14, a phase compensation circuit 18, a linear motor 19, a switch 33, a driving circuit 35, a focus control element (a focus actuator) 36, a logic circuit 40, a comparator 41, and a triangular-wave generator 42. The photodetector 12 has two photodetecting portions A and B. Signals output from the respective photodetecting portions A and B are amplified by the preamplifiers 13A and 13B, and then input into the differential amplifier 14. By means of the converging lens 9 and the split mirror 10, a knife edge detecting method can be realized, so that the output signal of the differential amplifier 14 functions as a focus error signal.

As to the focus error signal, the phase in the focus control system is compensated for by the phase compensation circuit 18. Then, the focus error signal is input into the driving circuit 35 via the switch 33 for closing a loop of the focus control system. When the focus control system is closed by the switch 33, the driving circuit 35 amplifies the power of the focus error signal from the phase compensation circuit 18, and outputs the amplified signal to the focus control element 36. With the above-described construction, the focus control element 36 is driven so that the light beam converged on the disk is in the prescribed converged state, when the loop of the focus control system is closed. To the switch 33, the output signal from the triangular-wave generator 42 is also input. The focus error signal is also input into the logic circuit 40 via the comparator 41. The logic circuit 40 controls the open/close state of the switch 33.

The linear motor 19 moves the objective lens 5, the focus control element 36, the polarization beam splitter 3, and the like in a direction across the tracks on the disk 7. The linear motor 19 is usually activated when the converged point of the light beam is to be moved onto a predetermined track.

On the other hand, the other light beam 15 which is split by the split mirror 10 is input into the 2-section photodetector 16 of the tracking control apparatus. The photodetector 16 has two photodetecting portions C and D. A difference output signal between the output signals from the photodetecting portions C and D functions as a tracking error signal for controlling the light beam on the disk 7 so as to properly scan the tracks. The tracking control is not directly related to the invention, so that the detailed description of the tracking control is omitted.

In the recording/reproducing apparatus having such a focus control apparatus, the focus control is performed as follows.

First, the disk 7 is rotated by the disk motor 6. When the rotation of the disk 7 attains a predetermined rotation frequency, the switch 33 is switched to the side of the triangular-wave generator 42. Thus, the focus control element 36 is driven by the signal having the triangular waveform from the triangular-wave generator 42. Accordingly, the objective lens 5 is moved downward or upward in a direction perpendicular to the recording face of the disk 7. Therefore, the converged point of the light beam on the disk 7 is moved downward or upward. An S-curved focus error signal (hereinafter referred to as an S-curved signal) appearing when the converged point of the light beam passes through the recording face is detected by the comparator 41. Based on the detection of the S-curved signal, the logical circuit 40 can tell whether the converged point of the light beam exists in the vicinity of the recording face or not. If the converged point exists in the vicinity of the recording face, the switch 33 is switched to the side of the phase compensation circuit 18. In this way, the focus control loop is closed, so that the converged point of the light beam is located at a desired optimum position by the focus control (i.e., focusing pull).

The operation of the focusing pull is described with reference to FIGS. 6, 7, and 8. FIG. 6 shows the waveforms of the S-curved signals appearing in the objective lens driving signal and the focus error signal during the focusing pull. FIG. 7 shows a waveform illustrating a relationship between a focus on level end the S-curved signals in a protect film (which serves as a disk surface) and a recording film of the disk 7 which appear in the focus error signal when the objective lens 5 is moved closer to or away from the disk 7. The term "focus on level" means a level at which the focusing pull is attained. FIG. 8 shows a schematic flowchart illustrating a basic focusing pull procedure in the focus control apparatus.

As shown in FIG. 8, when the power of the recording/reproducing apparatus is turned on, the disk motor 6 is activated in step S21, so that the disk 7 is rotated. When the rotation of the disk 7 attains a predetermined rotation frequency, the light source 1 is turned on in step S22, so that, for example, the semi-conductor laser emits light. Then, in step S23, the linear motor 19 starts to operate, so that the objective lens 5 is moved closer to the center of the disk 7, i.e., to the inner side of the disk 7. After the above-described initial operation is completed, the focusing pull operation is started.

First, as shown in (a) of FIG. 6, in response to the output signal from the triangular-wave generator 42, the objective lens 5 is moved downward, i.e., moved away from the disk 7, in step S24. Then, in step S25, the objective lens 5 is moved upward, i.e., moved closer to the disk 7. During the repetition of the up and down movement of the objective lens 5, it is detected in step S26 that the S-curved signal reaches a predetermined focus on level. After the predetermined focus on level is reached, the switch 33 is switched to the side of the phase compensation circuit 18 by the logic circuit 40. In step S27, the up and down movement of the objective lens 5 is stopped, and in step S28, the focus control is turned on. Thus, the pull operation is finished, and the focus control is started.

The detection level (focus on level) of the comparator 41 for pulling the focus is defined by the amplitudes of the S-curved signals which are respectively output due to the reflection from the recording film and the reflection from the protect film of the disk 7. As shown in FIG. 7, the focus on level is set to be greater than the peak of the S-curved signal of the protect film, and set to fall within the linear interval between the peak of the S-curved signal of the recording film and zero.

According to the above-described method, the conventional focus control apparatus realizes the focusing pull operation of the focus control. However, according to the conventional method, if there is only a small difference or no difference between the reflectivity of the protect film and the reflectivity of the recording film of the disk 7, it is difficult to set the detection level of the comparator 41. Depending on the variety of disks 7 and/or the level of noise, in some cases, the S-curved signal of the protect film may be erroneously detected as the S-curved signal of the recording film, so that the switch 33 is closed. In such a case, the protect film portion is not in the linear interval of the focus (pull range), so that the focus cannot be pulled. This may often cause a failure of activation of the focus control apparatus.

Japanese Laid-Open Patent Publication Nos. 64-89027 and 57-150147 propose methods for solving such a problem.

In the method proposed in Japanese Laid-Open Patent Publication No. 64-89027, the objective lens is initially moved closest to the disk, and the converged point of the light beam is set beyond the recording film. The detection of the recording film is surely performed by using the S-curved signal first appearing when the objective lens is moved away from the initial position. In the method proposed in Japanese Laid-Open Patent Publication No. 57-150147, the number of appearing times of the S-curved signal is counted. Thus, when the objective lens is moved closer to the disk, it is detected that the objective lens reaches a position at which the converged point of the light beam is just on the recording film, so that the focus is pulled.

By these methods, the focus can be surely pulled in the S-curved signal portion of the recording film. However, it is necessary to appropriately adjust the signal level of the focus error signal in order to prevent any malfunction due to the saturation and level reduction of the focus error signal actually caused by the variation in reflectivity of the disk. If such an adjusting operation is introduced during the activation of the focus control apparatus, as shown in the waveforms in FIG. 9 and the flowchart of FIG. 10, in general, the objective lens should be moved close to (step S39) and away from (steps S35 and S43) the disk. Thus, the measurement of the amplitude of the S-curved signal (steps 836, 840, and 844) and the measurement and adjustment of the focus on level by the comparator based on the measurement (steps S37, S38, S41, and S42) are required.

The speed for moving the objective lens closer to or away from the recording medium for a focusing pull is about 3 mm/s, and the required focusing pull time is about 500 ms to 1 sec. in view of the time for moving the objective lens in the radial direction by a linear motor and the like. The activation time of the recording/reproducing apparatus is about 5 sec., so that the ratio of the time for the focusing pull to the total activation time is high. In addition, in order to secure the stability of the pull, if the S-curved signal measuring operation and the changing operation for the input gain are introduced for the focusing pull, the activation time becomes too long.

In a disk (specifically, CD and LD), the magnitude of variation of the face in a horizontal level (hereinafter referred to as a face variation magnitude) is large. In some CDs, the magnitude may be ±500 μm at the peripheral portion (at a standard rotation frequency, the acceleration is 10 m/s$^2$). With a large face variation magnitude, the relative speed when the objective lens is moved closer to and away from the disk is varied. Thus, in some cases, the time interval in which the pull operation can be performed may be very short, so that it is difficult to perform the focusing pull operation. That is, when the focus control operation is started after the S-curved signal is detected, the converged point of the light beam is already positioned outside the pull range, so that the focusing pull cannot be performed due to the nonlinear operation. Even if the focusing pull can be performed, the over shoot of the focus error signal immediately after the pull is large, and hence the control is unstable. Moreover, if the acceleration due to the face variation magnitude of the disk is large or there occurs external vibration shock, the focusing pull may often be failed and the focus control apparatus cannot be activated. Thus, the reliability of the apparatus is unacceptable.

SUMMARY OF THE INVENTION

The focus control apparatus of this invention includes: rotation means for rotating a recording medium; converging means for converging and radiating a light beam on the recording medium which is rotated by the rotation means; first moving means for moving a converged point of the light beam which is converged by the converging means in a direction substantially perpendicular to a face of the recording medium; second moving means for moving the converged point of the light beam which is converged by the converging means in a direction across tracks on the face of the recording medium between an innermost track and an outermost track; converged state detection means for generating a signal depending on a converged state of the light beam on the recording medium; and focus control means for driving the first moving means in accordance with the signal output from the converged state detection means and for controlling the converged state so that a converged position of the light beam on the recording medium is substantially fixed, wherein the focus control means includes: amplitude detection means for detecting an amplitude of the signal output from the converged state detection means; and timing control means for controlling timings so that the rotation means, the first moving means, and the second moving means start to operate substantially simultaneously.

In one embodiment of the invention, the focus control means further includes: gain changeable means for changing a gain of the converged state detection means in accordance with the amplitude detected by the amplitude detection means, after the rotation means, the first moving means and the second moving means start to operate at the timings controlled by the timing control means; and level calculation means for setting a focus on level for making a focus control in an operating state, in the signal output from the converged state detection means having the gain changed by the gain changeable means.

In another embodiment of the invention, when the focus control cannot be made in the operating state by the focus on level which is first set by the level calculation means, the level calculation means sets a focus on level again in accordance with the amplitude of the signal output from the converged state detection means having the gain changed by the gain changeable means, the amplitude being detected by the amplitude detection means.

In another embodiment of the invention, when the second moving means starts to operate, the converged point of the light beam is first moved to a radially inner side of the recording medium.

According to another aspect of the invention, a focus control method in a focus control apparatus is provided. The focus control apparatus includes: rotation means for rotating a recording medium; converging means for converging and radiating a light beam on the recording medium which is rotated by the rotation means; first moving means for moving a converged point of the light beam which is converged by the converging means in a direction substantially perpendicular to a face of the recording medium; second moving means for moving the converged point of the light beam which is converged by the converging means in a direction across tracks on the face of the recording medium between an innermost track and an outermost track; converged state detection means for generating a signal depending on a converged state of the light beam on the recording medium; and focus control means for driving the first moving means in accordance with the signal output from the converged state detection means and for controlling the converged state so that a converged position of the light beam on the recording medium is substantially fixed. The focus control method includes the steps of: detecting an amplitude of the signal output from the converged state detection means; and controlling timings so that the rotation means, the first moving means, and the second moving means start to operate substantially simultaneously.

In one embodiment of the invention, the method further includes the steps of: changing a gain of the converged state detection means in accordance with the detected amplitude, after the rotation means, the first moving means and the second moving means start to operate at the timings controlled by the timing control means; and setting a focus on level for making a focus control in an operating state, in the signal output from the converged state detection means having the changed gain.

In another embodiment of the invention, when the focus control cannot be made in the operating state by the focus on level which is first set, a focus on level is set again in accordance with the detected amplitude of the signal output from the converged state detection means having the changed gain.

In another embodiment of the invention, when the second moving means starts to operate, the converged point of the light beam is first moved to a radially inner side of the recording medium.

Thus, the invention described herein makes possible the advantages of (1) proposing a high-speed and stable control method for a focusing pull of a focus control and (2) providing a focus control apparatus with high performance in which the activation time is short.

These and other advantages of the present invention will become apparent to those skilled in the art upon reading and understanding the following detailed description with reference to the accompanying figures.

DESCRIPTION OF THE PREFERRED EMBODIMENTS

Figure 1:
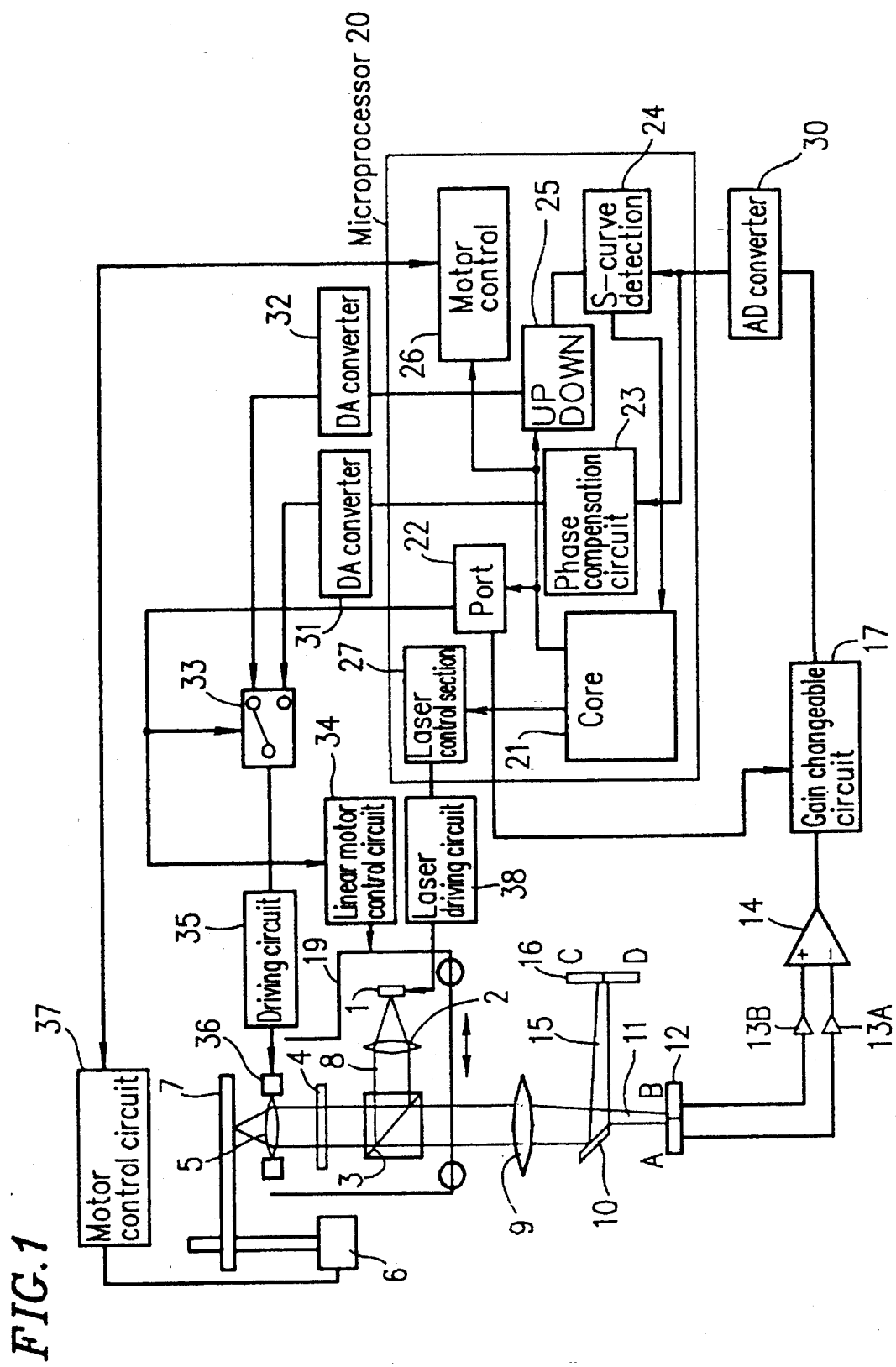
FIG. 1 is a block diagram showing the construction of a focus control apparatus for illustrating the construction of an example of the invention for performing a focusing pull of the focus control by adapting a microprocessor.

Referring to the accompanying drawings, examples of the invention will be described in detail. In the figures, the same components are indicated by the same reference numerals as those in the conventional example.

FIG. 1 shows a block diagram for illustrating the construction of an example of the invention which performs a focusing pull via the focus control by adapting a microprocessor.

As shown in FIG. 1, the recording/reproducing apparatus 5 of the invention includes an optical system for irradiating a disk 7 as a recording medium with a light beam 8, and a disk motor 6 for rotating the disk 7 at a predetermined rotation frequency. The optical system includes a light source 1 such as a semiconductor laser, a coupling lens 2, a polarization beam splitter 3, a polarizing plate 4, and an objective lens 5. The light beam 8 generated from the light source 1 is collimated by the coupling lens 2. The collimated light is then reflected from the polarization beam splitter 3 and passes through the polarizing plate 4. Then, the light is converged by the objective lens 5, and incident on the disk 7 which is rotated by the disk motor 6.

The recording/reproducing apparatus further includes a converging lens 9 and a slit mirror 10 as elements for receiving the light reflected from the disk 7. The light reflected from the disk 7 passes through the objective lens 5, the polarizing plate 4, and the polarization beam splitter 3, and is split into light beams 11 and 15 in two directions by the split mirror 10 via the converging lens 9. The light beams 11 and 15 are input into a focus control apparatus and a tracking control apparatus, respectively.

The light beam 15 is input into a 2-section photodetector 16 of the tracking control apparatus. The photodetector 16 has two photodetecting portions C and D. A difference output signal between the output signals from the photodetecting portions C and D functions as a tracking error signal for controlling the light beam on the disk 7 so as to properly scan the tracks. The tracking control is not directly related to the invention, so that the detailed description of the tracking control is omitted.

On the other hand, the focus control apparatus includes a 2-section photodetector 12, preamplifiers 13A and 13B, a differential amplifier 14, a gain changeable circuit 17, a linear motor 19, a microprocessor 20, an AD converter 30, DA converters 31 and 32, a switch 33, a linear motor control circuit 34, a driving circuit 35, a focus actuator 36, and a laser driving circuit 38. The other light beam 11 which is split by the split mirror 10 is input into the photodetector 12. The photodetector 12 has two photodetecting portions A and B. Signals output from the respective photodetecting portions A and B are amplified by the preamplifiers 13A and 13B, and then input into the differential amplifier 14. By means of the converging lens 9 and the split mirror 10, a knife edge detecting method can be realized, so that the output signal of the differential amplifier 14 functions as a focus error signal.

As to the focus error signal, the amplitude thereof is changed in accordance with the light amount of the light beam corresponding to the reflectivity of the disk 7 and the like, and hence adjusted to be a predetermined amplitude (gain). Thereafter, the focus error signal is converted into a digital value by the AD converter 30, and then input into the microprocessor 20.

In the microprocessor 20, a digital control system is constituted. The microprocessor 20 includes a core 21, a port 22, a phase compensation circuit 23, an S-curve detecting section 24, an UP/DOWN section 25, a motor control section 26, and a laser control section 27. The digital focus error signal is input into the phase compensation circuit 23. The phase compensation circuit 23 is a digital filter which includes an adder, a multiplier, and a delay. The phase delay of the focus error signal in the focus control system is compensated for by the phase compensation circuit 23, so as to be a focus control signal. Then, the focus control signal is converted into an analog value by the DA converter 31. The analog focus control signal is input into the driving circuit 35 via the switch 33 which turns on/off the focus control system. The driving circuit 35 appropriately amplifies the current of the focus control signal and then converts the level of the focus control signal, so as to drive the focus actuator 36. In this way, the focus actuator 36 is driven so that the light beam on the disk 7 is always in a prescribed converged state.

The focus error signal after the AD conversion is branched and processed in the microprocessor 20, so as to implement the focusing pull operation. Sections which implement the focusing pull by software and hardware in the microprocessor 20 will be described.

The S-curve detecting section 24 detects that the amplitude of the S-curved signal and the focus error signal reach predetermined levels based on a sample value of the focus error signal after the AD conversion.

The core 21 calculates a changing gain value for the gain changeable circuit 17 for optimizing the amplitude, based on the amplitude of the S-curved signal detected by the S-curve detecting section 24. In addition, an actual level for a focusing pull is calculated by the amplitude after the gain changing, and the calculated value is output to the S-curve detecting section 24. Moreover, in accordance with the result of the S-curve detecting section 24, the core 21 controls the UP/DOWN section 25 and operates the port 22, so that the gain value of the gain changeable circuit 17 is changed to be a predetermined gain, or so that the switch 33 is switched to operate the focus control. Furthermore, in addition to the series of focusing pull operations (the focusing pull operation will be described later in detail), the core 21 controls respective sections of the microprocessor 20 in order to implement the operation for a filter processing after the focus control is turned on, or the reactivation when the focus control was failed.

The UP/DOWN section 25 moves the objective lens 5 closer to or away from the disk 7 by a predetermined distance by outputting a predetermined value via the DA converter 32. In addition to the switching of the switch 33 and the changing of the gain changeable circuit 17, the port 22 operates the linear motor control circuit 34 by the output signal thereof, so as to move the objective lens 5 in the radial direction of the disk 7.

The motor control section 26 controls the motor control circuit 37 so as to realize the optimum procedure for performing part of the focusing pull of the focus control during the operation of the disk motor 6.

By the instruction from the core 21, the laser control section 27 controls the light source 1 such as a semiconductor laser to emit light having a predetermined power. The signal from the laser control section 27 is input into the laser driving circuit 38, so as to drive the laser light source 1.

In this invention, the activation of the disk motor 6 and part of the focusing pull operation are simultaneously performed. Then, in order to continue the focusing pull operation by emitting laser light, the core 21 manages the states of the respective sections and controls the respective operations.

In addition, according to the invention, the core 21 controls the linear motor control section 34, so that the focusing pull operation of the focus control can be performed in the inner side portion of the disk with less face variation magnitude. Since the face variation magnitude in the inner central portion of the disk 7 is small, and the relative speed between the objective lens 5 and the disk 7 during the pull operation is low, as compared with the outer peripheral portion thereof, it is possible to realize a stable focusing pull operation. In addition, the track of the CD and MO (magneto-optical) disks is spiral from the radially inner side to the radially outer side (i.e., the innermost position has an address 0). Thus, in the case of a system in which an address 0 and a control track and an index region in the vicinity thereof are read after the activation, the activation time of the focus control apparatus can be further shortened.

Figure 2:
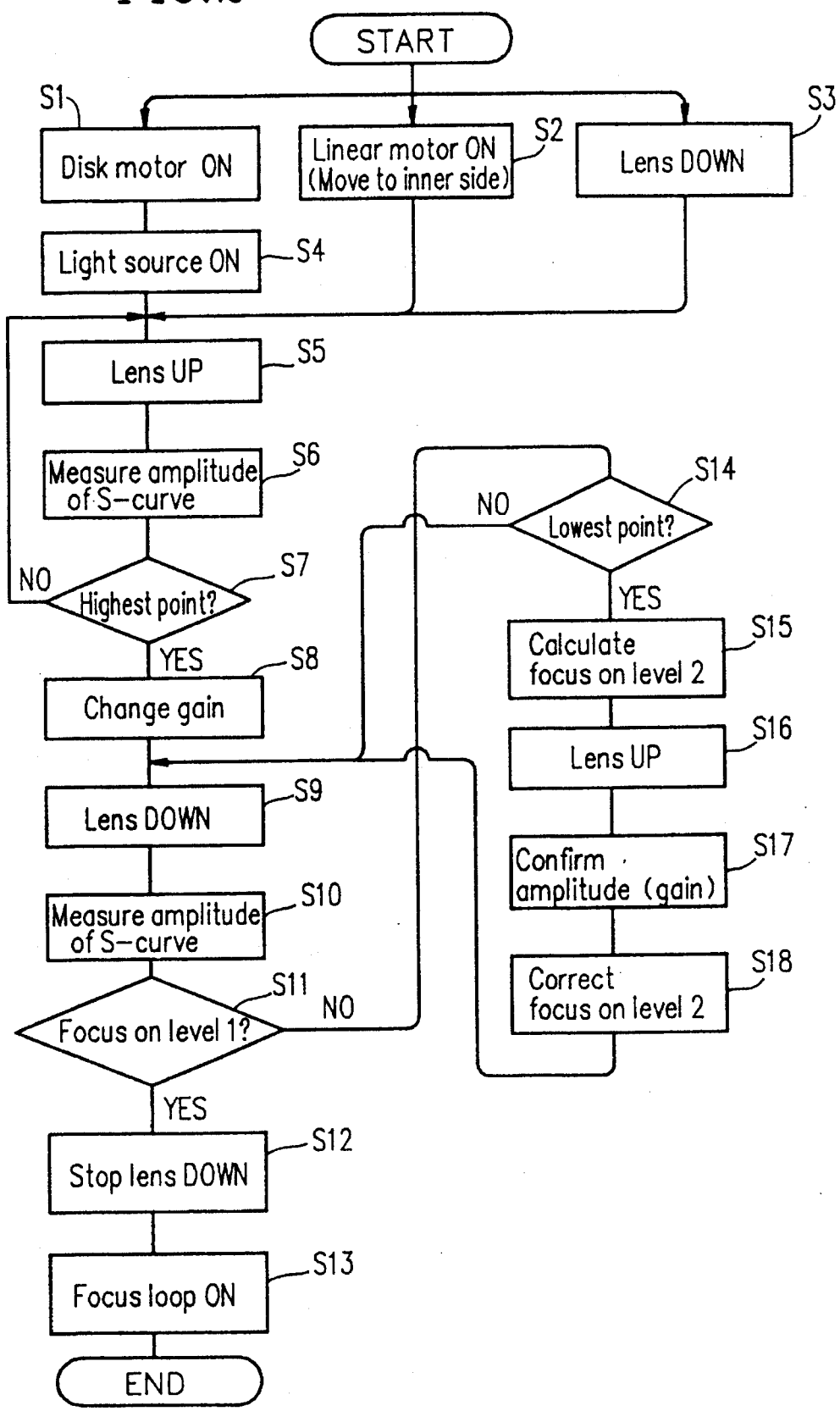
FIG. 2 is a flowchart illustrating the flow of the focusing pull operation of the focus control according to the invention.
Figure 3:
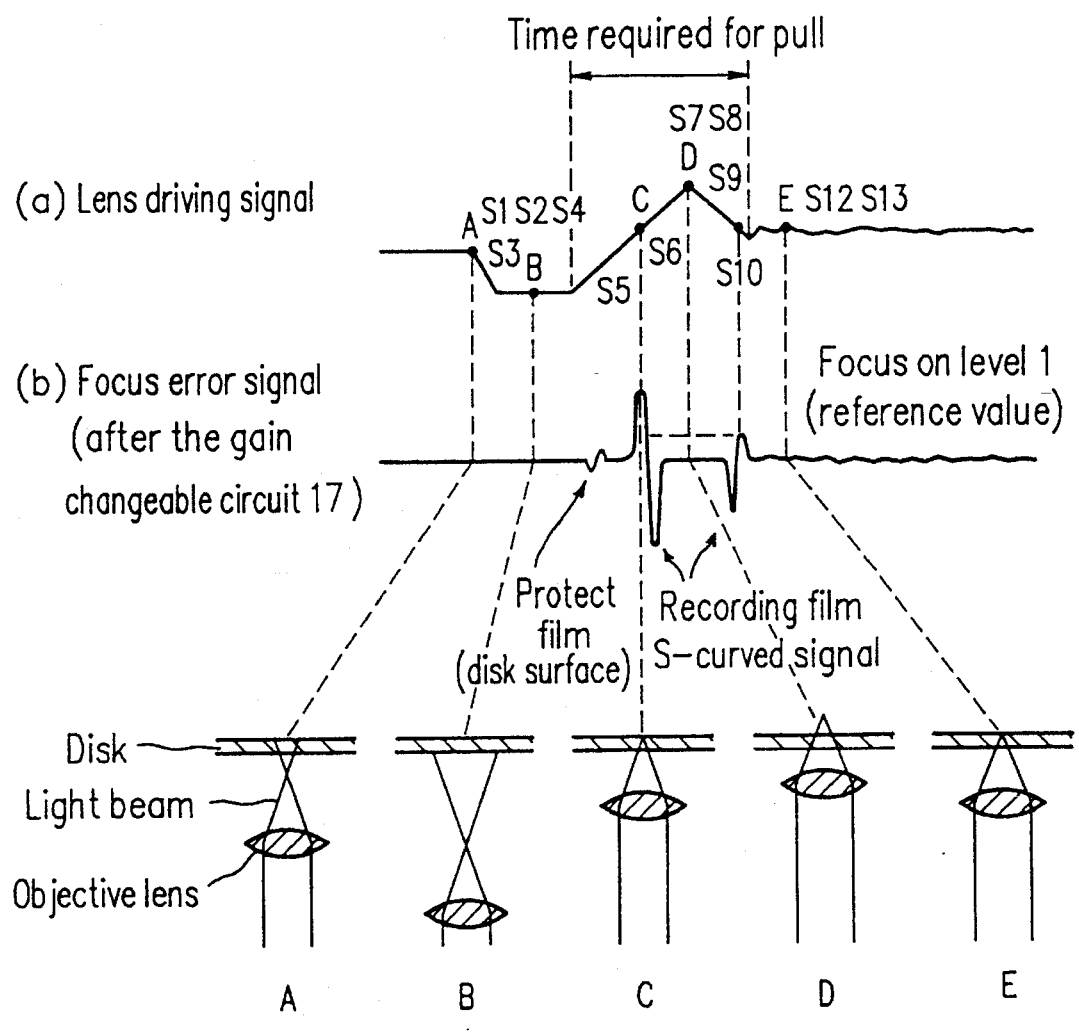
FIG. 3 is waveform charts (a) and (b) showing a lens driving signal and a focus error signal for illustrating the focusing pull operation of the focus control and a diagram showing the position of an objective lens at respective stages.

In the focus control apparatus having the above-described construction, the focusing pull operation implemented in the microprocessor 20 will be described with reference to FIGS. 2 and 3. FIG. 2 shows a flowchart of the focusing pull operation implemented by the microprocessor 20. FIG. 3 shows waveforms of an objective lens driving signal (a) and a focus error signal (b) in which S-curved signals appear, and a diagram showing the positional relationship between the disk 7 and the objective lens 5 at respective timings.

As shown in FIG. 2, when the power of the recording/reproducing apparatus is turned on, for rotating the disk motor 6, the core 21 of the microprocessor 20 operates the motor control section 26 so as to send out a DMON signal as a rotation instruction in step S1. Thus, the disk 7 is rotated at a predetermined rotation frequency. The disk motor 6 requires an activation time of about 1 second until the rotation frequency thereof reaches a predetermined rotation frequency. Therefore, after the rotation instruction is sent out to the disk motor 6, a signal is sent out from the port 22 to the linear motor control circuit 24 in step S2, and the objective lens 5 is moved to the inner side of the disk 7 with less face variation magnitude. Immediately after this step, in step S3, a predetermined value is output from the UP/DOWN section 25, so that the objective lens 5 is moved downward from the initial position a toward the remotest point B as shown in FIG. 3 by means of the driving circuit 35 and the focus actuator 36. When the recording/reproducing apparatus is horizontally located, the objective lens 5 is usually positioned at a lower position due to its weight. The S-curved signal does not appear in the focus error signal when the objective lens 5 stays at this lower position. Therefore, the amplitude of the S-curved signal cannot be measured at this lower position. After the objective lens 5 is moved at the remotest point B, the measurements of the amplitude of the S-curved signal and the detection of the focus on level are performed.

Herein, the times required for steps S1–S3 have the following relationship: (time for activating the disk motor 6 (step S1))>(time for moving the linear motor 19 (step S2))>(time for lowering the objective lens 5 (step S3)). Each of the required times is several hundreds of milliseconds or more. Thus, the instructions from the microprocessor 20 are regarded as being output at the same time, in view of the respective required times, as shown in FIG. 2.

The motor control section 26 detects that the disk 7 attains the predetermined rotation frequency. At this time, the movements of the linear motor 19 and the objective lens 5 have usually been completed. In step S4, after the laser light source 1 emits light, the focusing pull operation of the actual focus control is started substantially at the innermost position of the disk 7. Respective steps S1, S2, and S3 are separately and independently controlled, so that the light emitting of the laser light source 1 (step S4) may be performed before the movements of the linear motor 19 and the objective lens 5 (steps S2 and S3) are not completed.

As shown in FIG. 3, the objective lens 5 is positioned at the remotest point B, so that in step S5, the objective lens 5 is gradually moved closer to the disk 7 toward the closest point D. Simultaneously, in step S7, the S-curve detecting section 24 samples the focus error signal. When the converged point of the light beam becomes closer to the recording face as in the conventional example, the amplitude of the S-curved signal appearing in the vicinity of the converged point C as shown in (b) of FIG. 3 is measured. When the objective lens 5 is detected to reach the highest point (the closest point) D in step S7, the core 21 outputs a predetermined signal from the port 22 in accordance with the measured amplitude value, so as to change the gain of the gain changeable circuit 17 in step S8. At this time, the S-curved signal corresponding to the gain changed by the gain changeable circuit 17 has the optimum amplitude for surely detecting the focus on level via the S-curve detecting section 24 in the microprocessor 20.

After the amplitude level of the S-curved signal, the UP/DOWN section 25 gradually lowers the objective lens 5 from the closest point D in step S9. In step S10, the S-curve detecting section 24 measures the S-curve amplitude of the focus error signal. During this measurement, in step S11, if the S-curve detecting section 24 detects that the focus error signal reaches a focus on level 1, the core 21 stops the operation of the UP/DOWN section 25 and stops the lowering of the objective lens 5 in step S12. Simultaneously, in step S13, the port 22 outputs a signal so as to switch the switch 33. As a result, the loop of the focus control is closed, so that the focus control for the light beam on the disk 7 is started.

Figure 4:
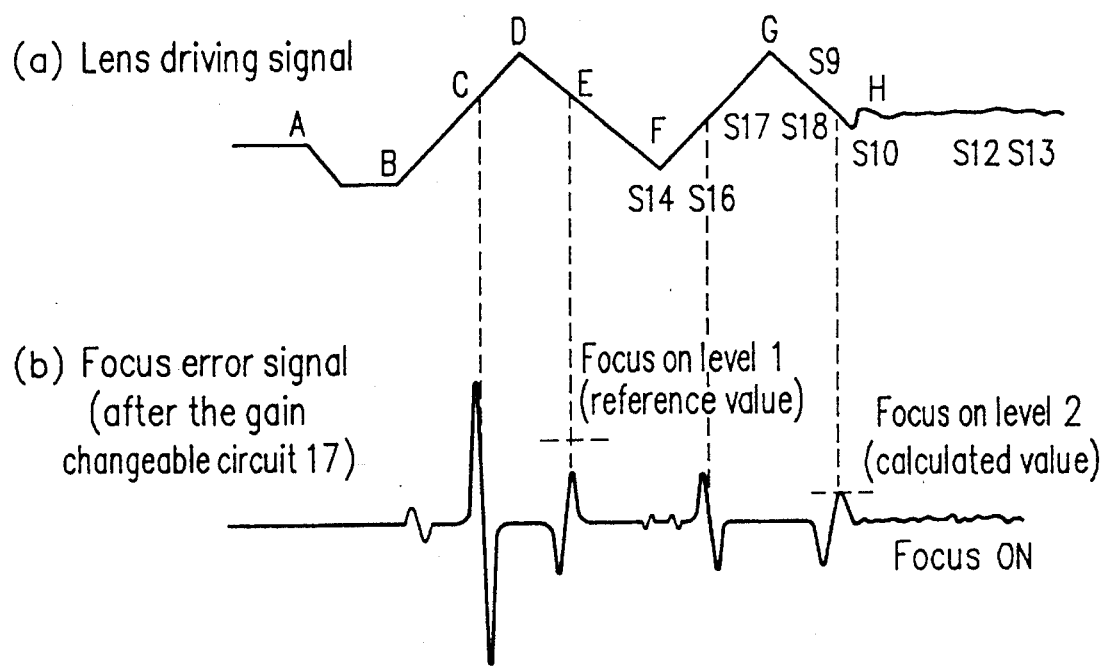
FIG. 4 is waveform charts (a) and (b) showing a lens driving signal and a focus error signal for illustrating the focusing pull operation of the focus control.
Figure 5:
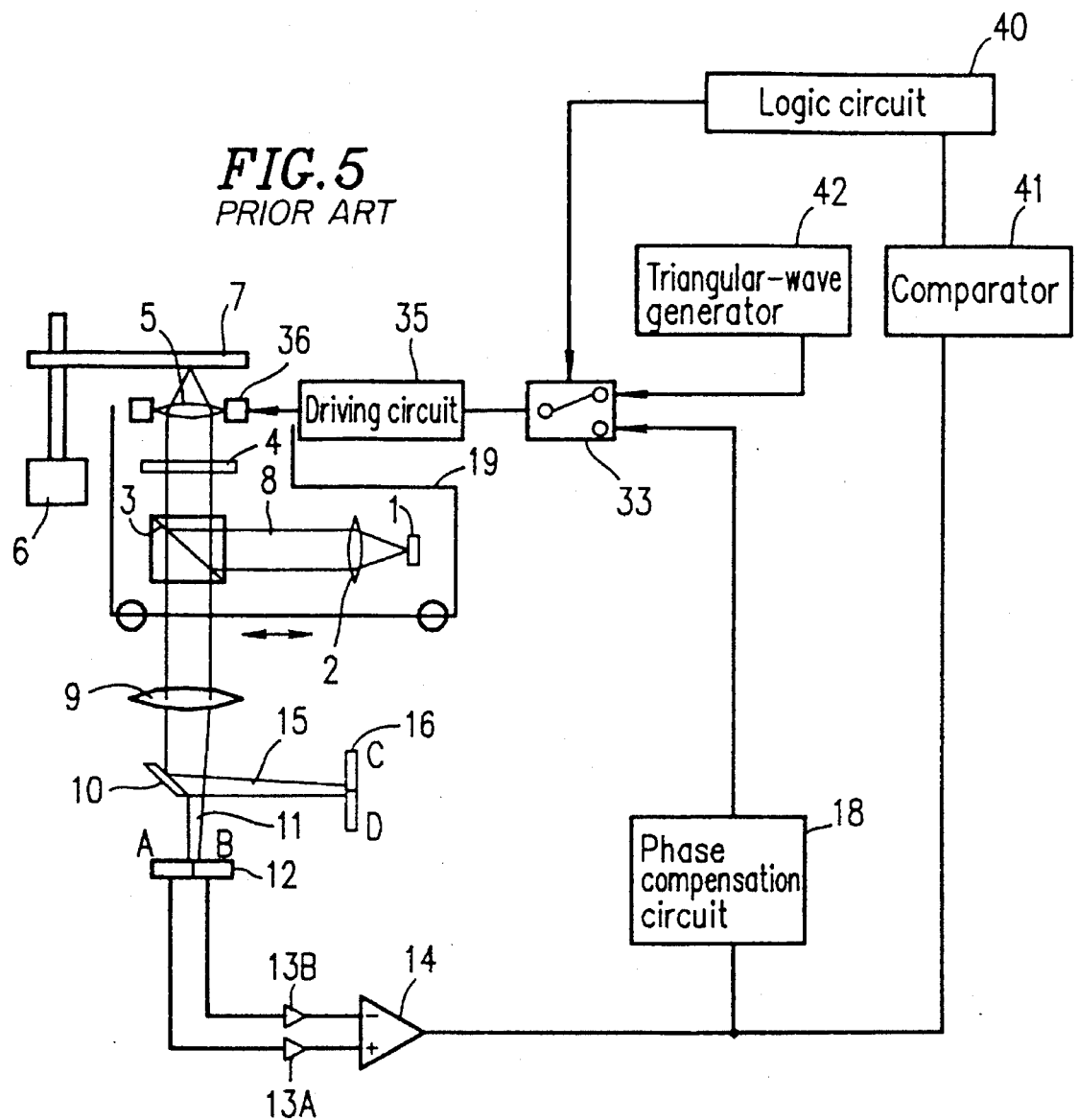
FIG. 5 is a block diagram showing the construction of a conventional focus control apparatus.
Figure 6:
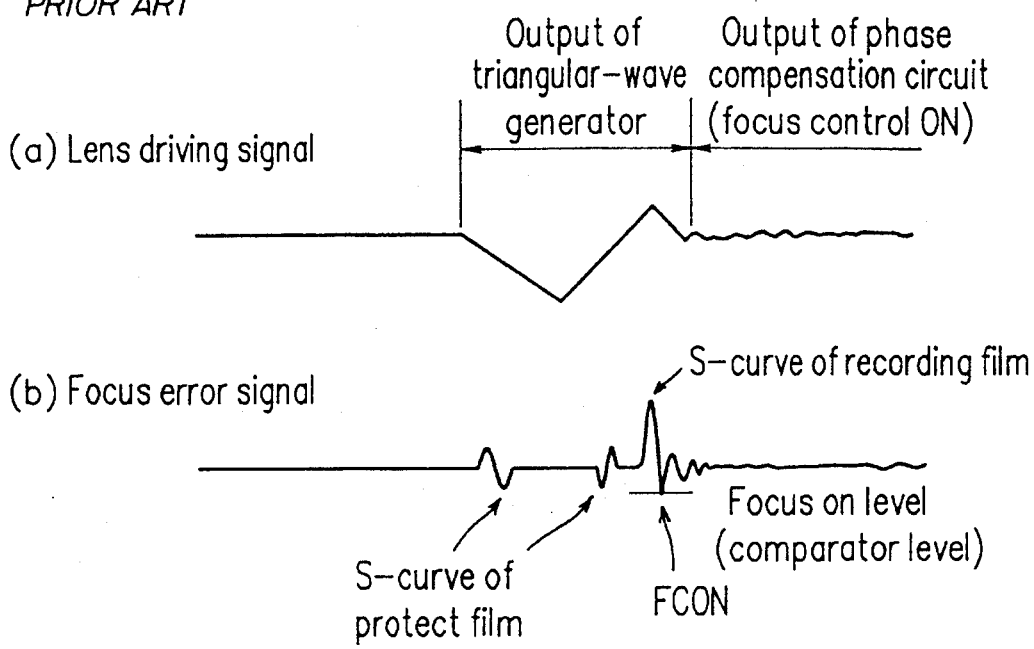
FIG. 6 is waveform charts (a) and (b) for illustrating a focusing pull operation of a conventional focus control.
Figure 7:
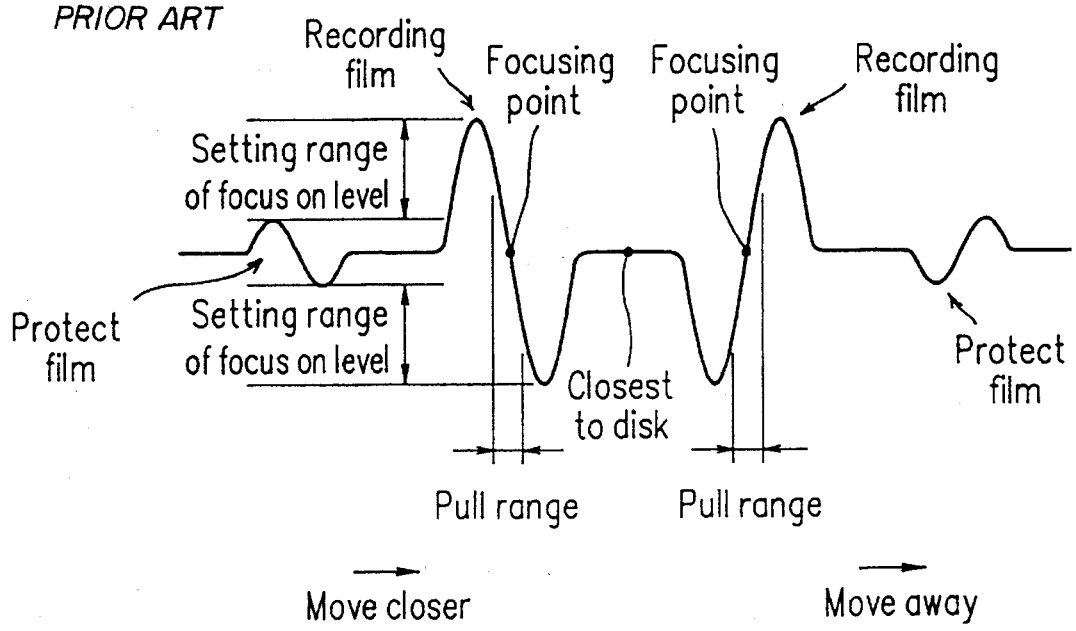
FIG. 7 is a waveform chart for illustrating the flow of the focusing pull operation of the conventional focus control.
Figure 8:
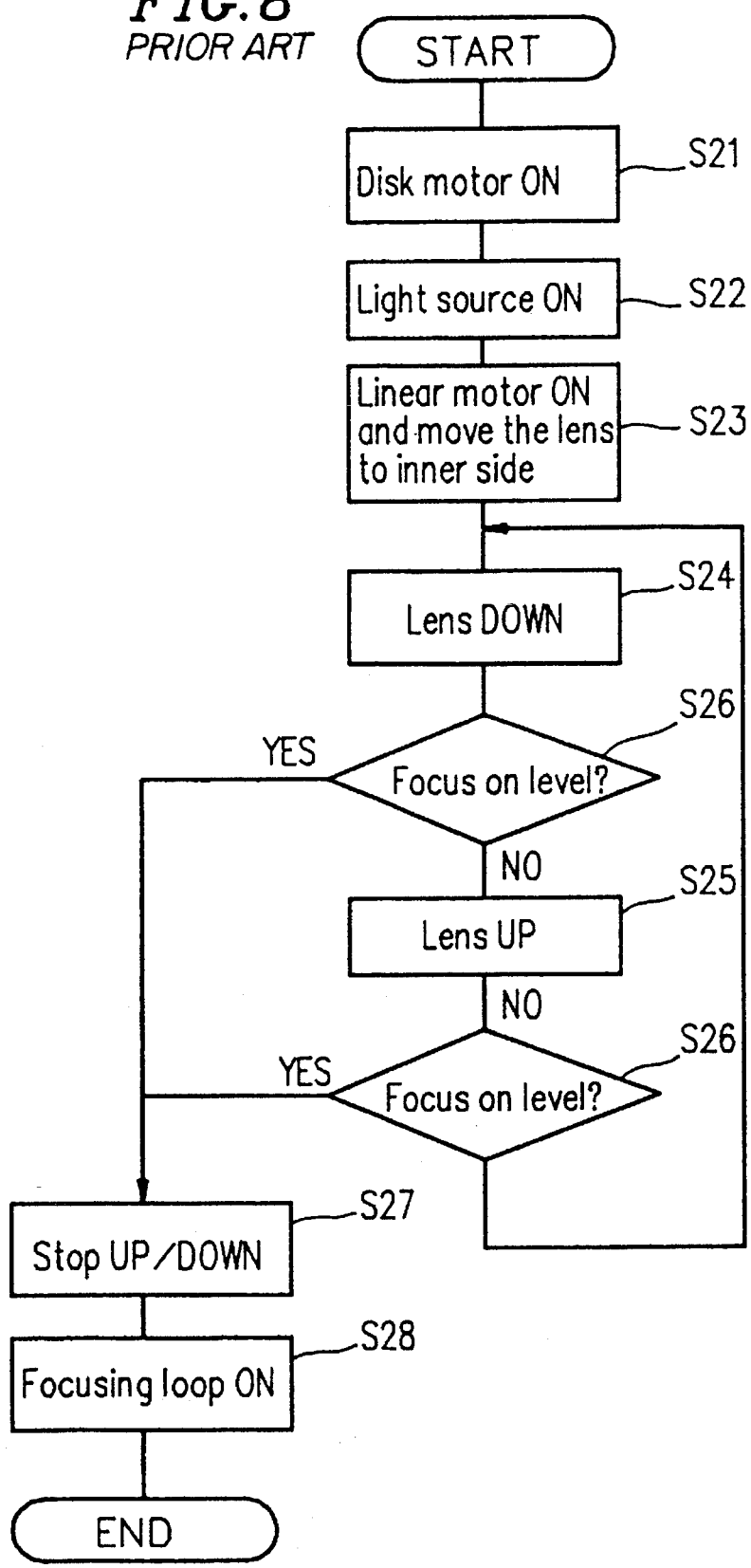
FIG. 8 is a flowchart illustrating the focusing pull operation of the conventional focus control.
Figure 9:
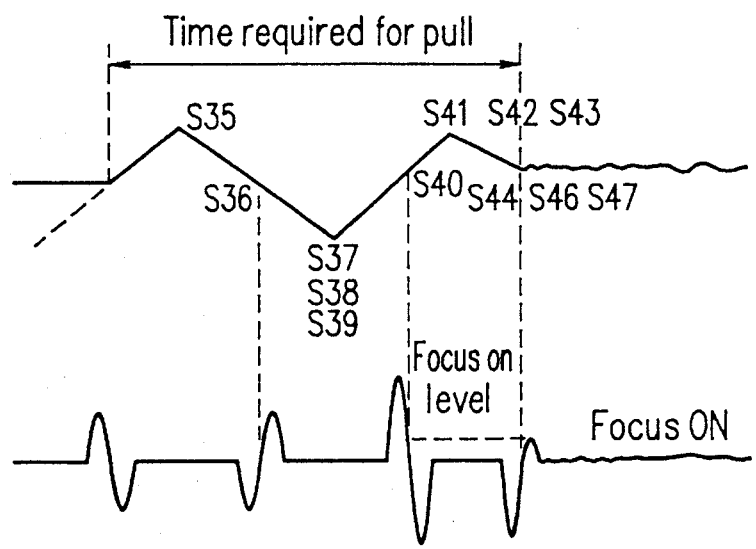
FIG. 9 is waveform charts (a) and (b) of the operation in which the measurement operation is added for stabilizing the focusing pull operation of the conventional focus control.
Figure 10:
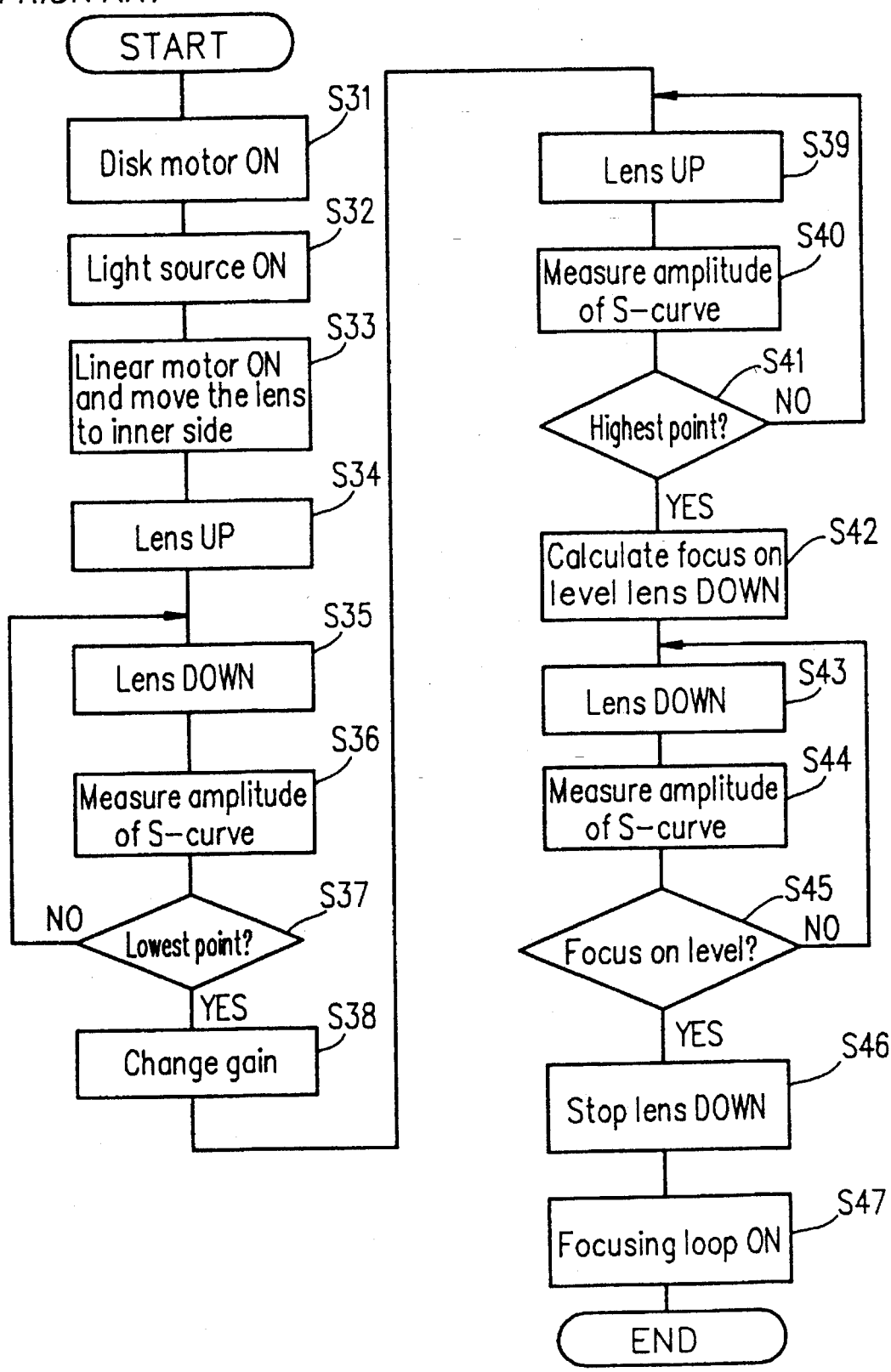
FIG. 10 is a flowchart illustrating the flow of the operation shown in FIG. 9.

Usually, when the objective lens 5 is moved upward and downward once as shown in steps S1–S13, the focus on level 1 which is the reference value can be detected. However, in some cases, the focus on level 1 cannot be detected in step S11, as shown in FIG. 4. In an example case, the amplitude of the S-curved signal is not measured with a sufficient precision in step S6 because of the variety of disks 7, heads, and the like. Even in such cases, the S-curve detecting section 24 always samples the focus error signal. Thus, when the focus on level 1 cannot be detected and the objective lens 5 reaches the remotest point F which is the same point as the point B, in step S14, the amplitude of the S-curved signal during the lowering of the objective lens 5 as shown in FIG. 3 can be measured. Therefore, in step S15, the core 21 performs a correcting operation on the basis of the focus on level 1 so as to calculate a focus on level 2 for the measured S-curve amplitude. The calculated value is set in the S-curve detecting section 24.

Thereafter, in step S16, the UP/DOWN section 25 gradually lifts the objective lens 5 again from the remotest point F toward the closest point G, and the S-curve detecting section 24 measures the amplitude of the S-curved signal which is output at this time. In step S17, the core 21 determines whether the gain value for the gain changeable circuit 17 which is currently set is appropriate or not. In step S18, if it is not appropriate, the gain value for the gain changeable circuit 17 is changed by the port 22, and the focus on level 2 of the S-curve detecting section 24 is accordingly corrected and updated.

Thereafter, the process returns to step S9, and the objective lens 5 is gradually lowered again from the closest point G. When the output of the focus error signal which is sampled by the S-curved detecting section 24 as shown in FIG. 4 reaches the focus on level 2 (i.e., when the objective lens 5 reaches the focus point H), the core 21 deactivates the UP/DOWN section 25, and stops the lowering of the objective lens 5. Simultaneously, a signal is output from the port 22 for switching the switch 33, so as to close the focus control loop. Thus, the phase compensation circuit 23 as a digital filter starts its operation, so that the focus control of the light beam on the disk 7 is operated.

In the focusing pull operation of the focus control in the focus control apparatus implemented in accordance with the above-described procedure, the moving time of the linear motor 19 and the moving time of the objective lens 5 for learning the S-curve amplitude which have been long can overlap the activation time of the disk motor 6. Thus, it is possible to make the moving time of the linear motor 19 and the moving time of the objective lens 5 apparently nullify in the system as a whole. In addition, even if the focus on level is a reference level in the usual state, the gain of the control loop can be substantially made appropriate only by changing the gain depending on the reflectivity and the light amount of the light beam and by appropriately adjusting the amplitude value of the S-curved signal. Thus, the pull operation can be sufficiently performed. Therefore, it is possible to simplify the conventional learning process. Moreover, even if the focus on level cannot be detected, the level learning operation is performed in the next retry. Accordingly, the optimum gain and level setting are performed, so that a stable pull capability can be attained.

Therefore, it is possible to greatly shorten the pull time of the focus control and to ensure the pull stability.

In this example, the case where the objective lens is initially moved to the inner side of the disk with less face variation magnitude has been described. However, in another case where it is suitable for the objective lens to be initially moved to the outer side (e.g., in a case where the data recorded on the outer peripheral track is initially read), immediately after the rotation instruction is sent to the disk motor 6, an outer moving signal is sent to the linear motor control circuit 24. Then, the objective lens 5 is moved to the outer side of the disk 7 by the linear motor 19.

In this invention, the case where the objective lens 5 is initially moved away from the disk 7 has been described. However, if the reflectivity of the disk 7 to be reproduced is always substantially uniform, and there is almost no S-curved signal by the protect film of the surface of the disk 7, after the rotation instruction is sent to the disk motor 6, the objective lens 5 can be moved closer to the disk 7.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed

1. A focus control apparatus comprising:

rotation means for rotating a recording medium;

converging means for converging and radiating a light beam on the recording medium which is rotated by the rotation means;

first moving means for moving a converged point of the light beam which is converged by the converging means in a direction substantially perpendicular to a face of the recording medium;

second moving means for moving the converged point of the light beam which is converged by the converging means in a direction across tracks on the face of the recording medium between an innermost track and an outermost track;

converged state detection means for generating a signal depending on a converged state of the light beam on the recording medium; and focus control means for driving the first moving means An accordance with the signal output from the converged state detection means and for controlling the converged state so that a converged position of the light beam on the recording medium is substantially fixed, wherein the focus control means includes:

amplitude detection means for detecting an amplitude of the signal output from the converged state detection means; and timing control means for generating timings and for controlling the rotation means, the first moving means, and the second moving means to start to operate substantially simultaneously based on the timings.

2. A focus control apparatus according to claim 1, wherein the focus control means further includes:

gain changeable means for changing a gain of the converged state detection means in accordance with the amplitude detected by the amplitude detection means, after the rotation means, the first moving means and the second moving means start to operate at the timings controlled by the timing control means; and level calculation means for setting a focus on level for making a focus control in an operating state, in the signal output from the converged state detection means having the gain changed by the gain changeable means.

3. A focus control apparatus according to claim 2, wherein, when the focus control cannot be made in the operating state by the focus on level which is first set by the level calculation means, the level calculation means sets a focus on level again in accordance with the amplitude of the signal output from the converged state detection means having the gain changed by the gain changeable means, the amplitude being detected by the amplitude detection means.

4. A focus control apparatus according to claim 1, wherein, when the second moving means starts to operate, the converged point of the light beam is first moved to a radially inner side of the recording medium.

5. A focus control method in a focus control apparatus comprising:

rotation means for rotating a recording medium;

converging means for converging and radiating a light beam on the recording medium which is rotated by the rotation means;

first moving means for moving a converged point of the light beam which is converged by the converging means in a direction substantially perpendicular to a face of the recording medium;

second moving means for moving the converged point of the light beam which is converged by the converging means in a direction across tracks on the face of the recording medium between an innermost track and an outermost track;

converged state detection means for generating a signal depending on a converged state of the light beam on the recording medium; and focus control means for driving the first moving means in accordance with the signal output from the converged state detection means and for controlling the converged state so that a converged position of the light beam on the recording medium is substantially fixed, wherein the focus control method comprises the steps of:

detecting an amplitude of the signal output from the converged state detection means; and generating timings and controlling the rotation means, the first moving means, and the second moving means to start to operate substantially simultaneously based on the timings.

6. A focus control method according to claim 5, further comprising the steps of:

changing a gain of the converged state detection means in accordance with the detected amplitude, after the rotation means, the first moving means and the second moving means start to operate at the timings controlled by the timing control means; and setting a focus on level for making a focus control in an operating state, in the signal output from the converged state detection means having the changed gain.

7. A focus control method according to claim 6, wherein, when the focus control cannot be made in the operating state by the focus on level which is first set, a focus on level is set again in accordance with the detected amplitude of the signal output from the converged state detection means having the changed gain.

8. A focus control method according to claim 5, wherein, when the second moving means starts to operate, the converged point of the light beam is first moved to a radially inner side of the recording medium.

* * * * *